Aug. 29, 1944.　　　O. R. COURTNEY　　　2,356,918
AIRPLANE WING CONSTRUCTION
Filed Feb. 21, 1942　　　2 Sheets-Sheet 1

Inventor
Orley Ray Courtney.
By Samuel H. Davis.
Attorney

Aug. 29, 1944.     O. R. COURTNEY     2,356,918
AIRPLANE WING CONSTRUCTION
Filed Feb. 21, 1942     2 Sheets-Sheet 2

Inventor
Orley Ray Courtney

By Samuel H. Davis.
Attorney

Patented Aug. 29, 1944

2,356,918

UNITED STATES PATENT OFFICE 2,356,918

AIRPLANE WING CONSTRUCTION

Orley Ray Courtney, Lansing, Mich.

Application February 21, 1942, Serial No. 431,869

1 Claim. (Cl. 244—123)

This invention relates to airplane wings construction, and has to do with what is thought to be a new manner of building and especially bracing and strengthening airplane wings to make them better able to withstand the strains encountered in their operations. The object of the invention is a special construction proposing to use metal tubes of suitable metal such as aluminum one tube surrounding another exteriorly, and the tubes being of different lengths and diameters and secured to each other whereby increased rigidity and strength is attained without increasing the customary weight of such elements.

Of the drawings making a part of this application

Throughout the drawings and description the same number refers to the same part.

Figure 1:
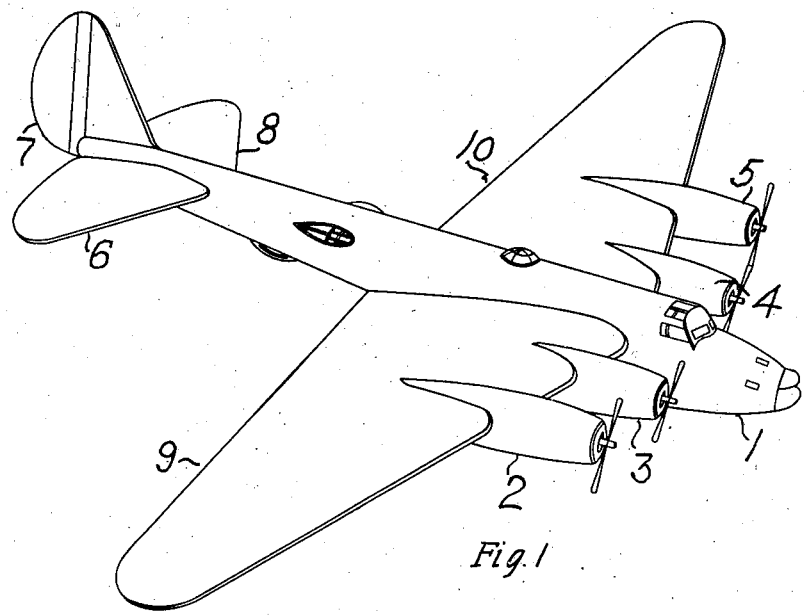
Fig. 1 represents a perspective view of a four motor airplane showing the usual location of the wings.
Figure 3:
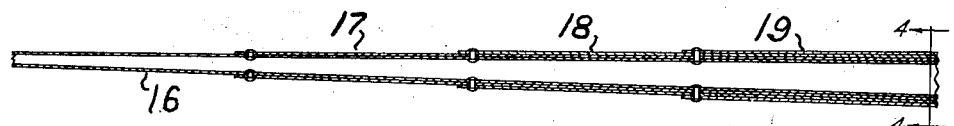
Fig. 3 is a sectional view lengthwise of one of the girders made in accordance with this invention.
Figure 4:
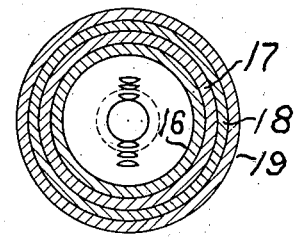
Fig. 4 is a cross-section on line 4—4 of Fig. 3.

Considering the drawings, Fig. 1 an airplane is shown having a body portion 1 with motors 2, 3, 4 and 5, and tail guide planes 6, 7 and 8, also the wings 9 and 10. The wings have a plurality of cross braces 12 usually made with orifices 13 circular in form as illustrated in Fig. 3. The cross braces have certain orifices provided with annular frames 14 and 15 within which are passed the parts termed for the purpose of this explanation the strengthening girders. These girders are made up of elongated frusto-conical tubes 16, 17, 18 and 19 of different lengths and diameters as shown in Fig. 3 and Fig. 4 and the tubular units are secured together as shown in Fig. 3.

Figure 2:
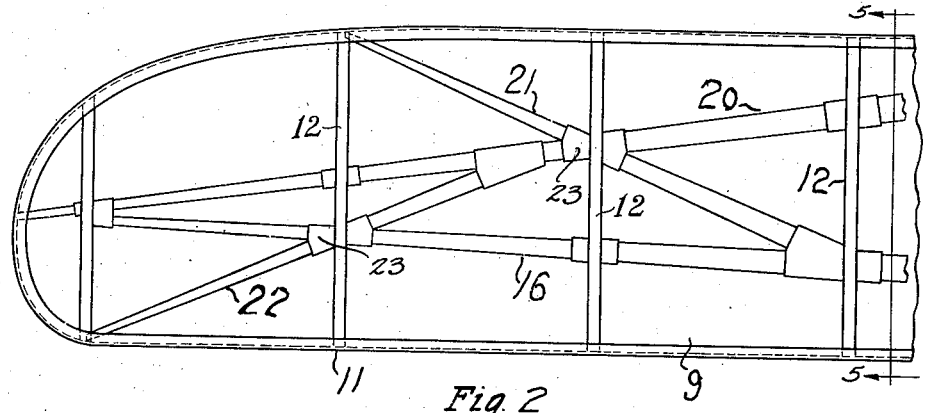
Fig. 2 is a top view of the end of an airplane wing without external covering and showing the locations of the strengthening members constructed in accordance with this invention.
Figure 5:
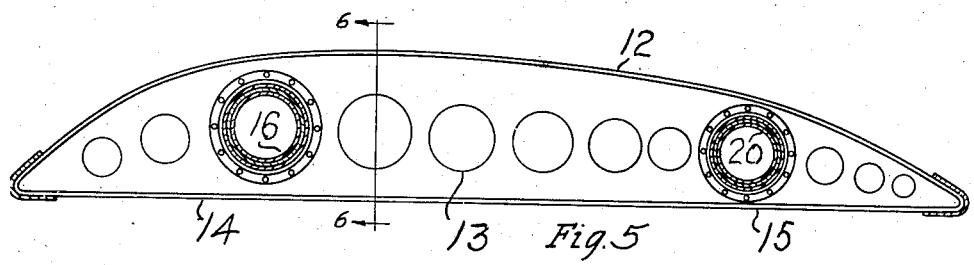
Fig. 5 represents a side elevational view of one of the cross braces.
Figure 6:
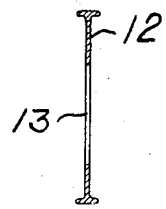
Fig. 6 is a vertical section of a cross brace on line 6—6 of Fig. 5.

As represented in Fig. 2 the girders 16 and 20 extend lengthwise of the frame 11 of the wing, while the girders 21 and 22 are disposed somewhat angularly to the others. A connection device such as connection 23 permits the attachment of each of the girders to each of the others.

As previously stated in this specification the invention consists in and comprises the special construction illustrated in Fig. 2. This arrangement may be further and more particularly described and the applicant's reasons for his preferred individual formation, association and joining of the various illustrated members, and the practical advantages thereof, to his mind, may be disclosed in the following detailed explanation. It will be noted in the drawings that the ends of the main multitubular girders 16 and 20 are most widely separated at the right of the figure which represents the end of the wing nearest and which is to be attached to the body of the airplane. These girders are the longest and they are made the strongest at the separated ends to withstand the weight and leverage thereon in operation. These girders 16 and 20 converge and lessen in diameter and consequently in weight as they extend and meet near the outermost end of the wing, passing through the cross braces 12. It will be noted that the end of the girder 20 extends quite to the outer end of the wing. This arrangement is intended to resist any bending up of the extreme end of the wing in operation. Next note diagonal bracing girder 22, and it will be observed that this girder is attached to the frame 11 near the outer end of the wing and acts to brace the rear side of the frame near the wing end. As usually arranged the end of the brace girder 22 meets the wing frame at the same location as the end of the outermost cross brace 12. That particular fixed point is not obligatory. Also in Fig. 2 observe diagonal girder 21 extending angularly and in opposite direction to girder 22. The diagonal girders 21 and 22 each is connected at two separated points with the converging main girders 16 and 20. The diagonal girder 21 is secured to the wing frame front at a distance from the wing end greater than the position of the like junction of the diagonal girder 22 and the frame 11.

The connecting devices 23 of the girders are tubular members of suitable shape and strength, and may be spot welded or riveted in place. It will be learned from this explanation and as shown in Fig. 2, that each girder is connected with each of the remaining girders. It is believed by the applicant that such arrangement adds advantageously to the strength and stiffness of the wing both back and front and throughout its length.

By means of the special construction and arrangement of the composite tubular girders the wings of the plane are noticeably strenghened without added weight. It will be noted and understood that the larger ends of the girders are attached to the plane body where the greatest stress and strain arises during the flight movements of the plane.

Having now described this invention, I claim:

In an airplane wing construction, a frame, main tubular girders extending convergently to the outer end of the frame, spaced cross braces connected with the frame and girders and extending straight across the frame, and diagonal girders connected with said main girders and said cross braces and extending in opposite directions, said diagonal girders being connected with the wing frame one near the end and at the rear side of the frame and one with the forward side of the frame and at a distance from the end of the frame.

ORLEY RAY COURTNEY.